May 15, 1934. L. R. TEEPLE Re. 19,164

STOKER CONTROL SWITCH

Original Filed March 26, 1930 5 Sheets-Sheet 1

INVENTOR
L. R. TEEPLE
BY C. B. Birkenbeuel.
ATTORNEY

May 15, 1934. L. R. TEEPLE Re. 19,164

STOKER CONTROL SWITCH

Original Filed March 26, 1930 5 Sheets-Sheet 2

INVENTOR
L. R. TEEPLE
BY C. B. Birkenhead
ATTORNEY

May 15, 1934. L. R. TEEPLE Re. 19,164

STOKER CONTROL SWITCH

Original Filed March 26, 1930 5 Sheets-Sheet 3

INVENTOR
L. R. TEEPLE
BY C. B. Bickenbach
ATTORNEY

May 15, 1934. L. R. TEEPLE Re. 19,164

STOKER CONTROL SWITCH

Original Filed March 26, 1930 5 Sheets-Sheet 4

INVENTOR
L. R. TEEPLE
BY C. B. Birkenbeuel.
ATTORNEY

May 15, 1934. L. R. TEEPLE Re. 19,164

STOKER CONTROL SWITCH

Original Filed March 26, 1930 5 Sheets-Sheet 5

INVENTOR
L. R. TEEPLE

BY C. B. Birkenbeuel.
ATTORNEY

Reissued May 15, 1934

Re. 19,164

UNITED STATES PATENT OFFICE 19,164

STOKER CONTROL SWITCH

Lawrence R. Teeple, Portland, Oreg.

Original No. 1,885,963, dated November 1, 1932, Serial No. 438,980, March 26, 1930. Application for reissue September 1, 1933, Serial No. 687,886

12 Claims. (Cl. 236—46)

This invention relates generally to switches for controlling the operation of stokers, and particularly to that form of controls in which the stoker is periodically operated.

The main object of this invention is to provide a time interval contacting mechanism for stokers which will be coordinated with the usual temperature and pressure controlled switches.

The second object is to secure the periodic operation of a stoker without detracting from the uniformity of the operation of the usual thermostat or pressure actuated controls.

The third object is to provide a time interval contacting mechanism for use in conjunction with temperature or pressure actuated controls which will be entirely safe in its operation and which will not cause the stoker to operate until a fixed period of time has elapsed after the stoker has been shut down by its other controls, either for the reason that the temperature is sufficiently high at the point of delivery or that the maximum pressure or temperature has been reached at the point of storage.

The fourth object is to so construct the device that it will be extremely simple to manufacture and not apt to get out of order.

These, and other objects, will become more apparent from the specification following as illustrated in the accompanying drawings, in which.

Similar numbers of reference refer to similar parts throughout the several views.

Figure 1:
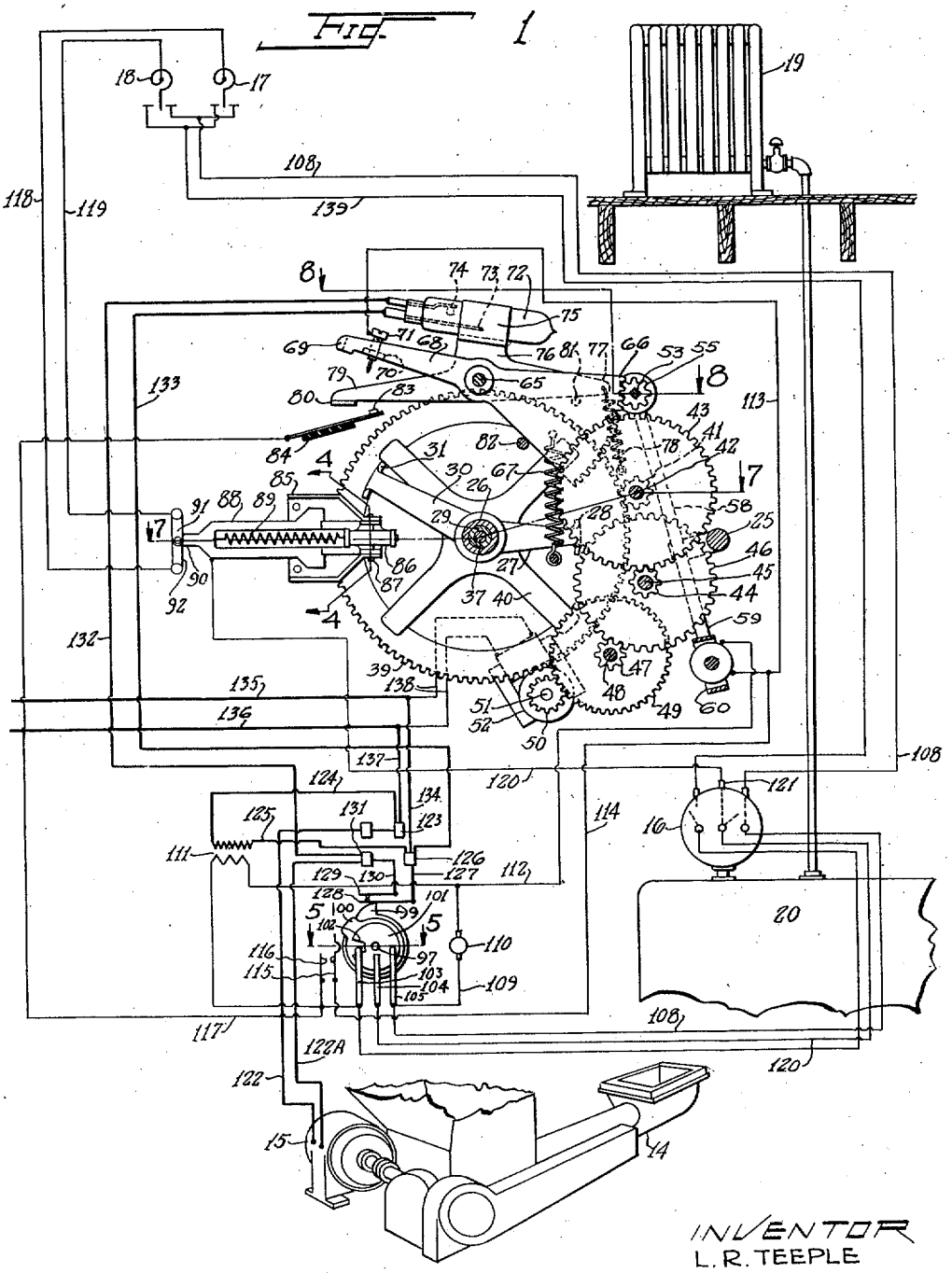
Figure 1 is a general view including the various circuits.
Figure 3:
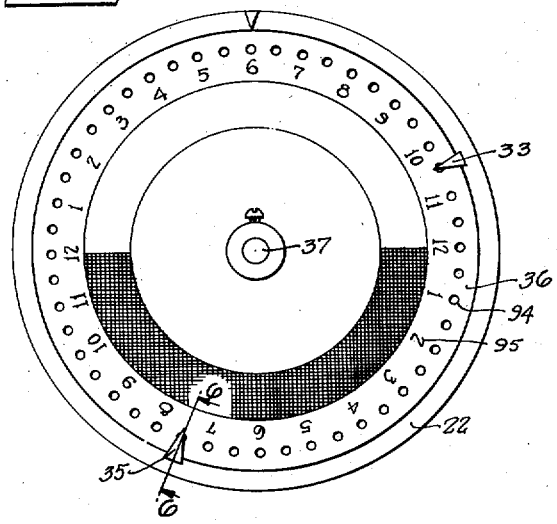
Figure 3 is a face view of the time dial.
Figure 4:
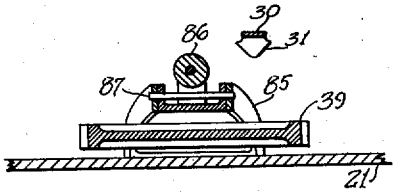
Figure 4 is a section taken along the line 4—4 in Fig. 1.
Figure 2:
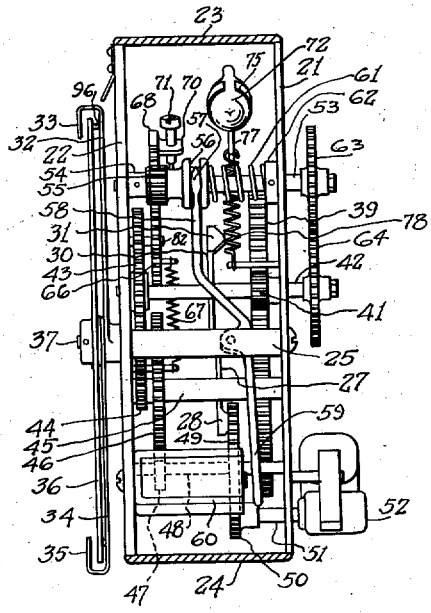
Figure 2 is a side view of the mercury switch and associated mechanism.
Figure 5:
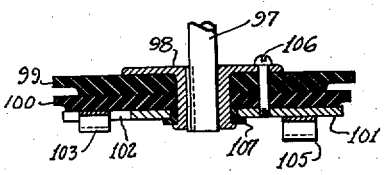
Figure 5 is a section taken along the line 5—5 of Fig. 1.
Figure 6:
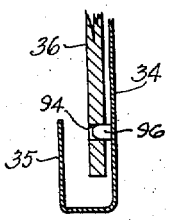
Figure 6 is a section taken along the line 6—6 in Fig. 3.
Figure 7:
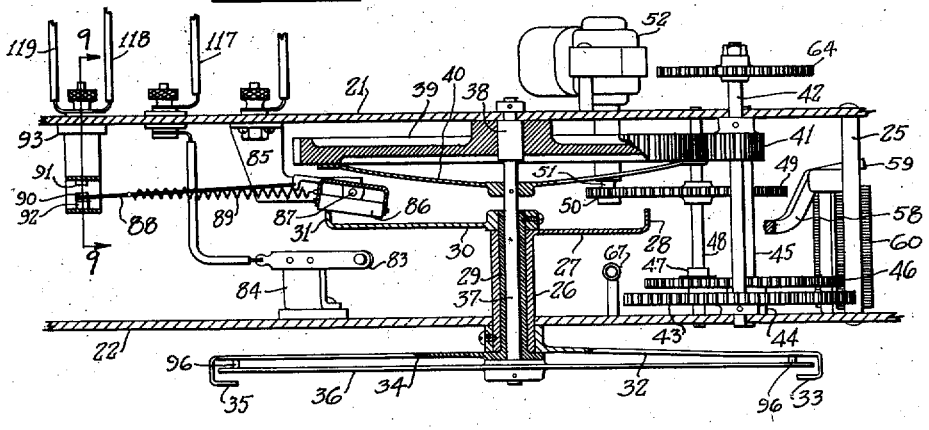
Figure 7 is a section taken along the line 7—7 in Fig. 1.
Figure 8:
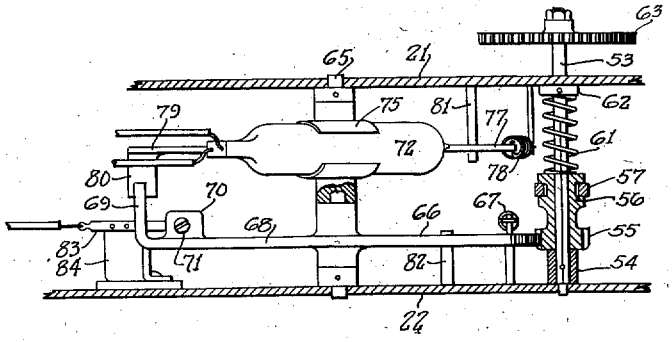
Figure 8 is a section taken along the line 8—8 in Fig. 1.
Figure 9:
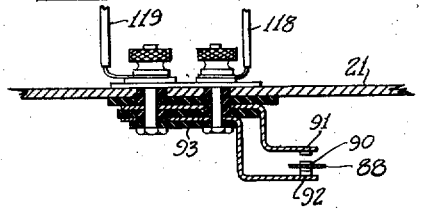
Figure 9 is a section taken along the line 9—9 in Fig. 7.

In order to illustrate this invention there is shown a stoker 14 which is operated by a motor 15. The motor 15 is normally controlled by means of a pressure actuated switch 16 working in conjunction with a double thermostatic element including the temperature controlled arms 17 and 18. There is also indicated a radiator 19 which is supplied with heat from the boiler 20 on which is mounted the pressure controlled switch 16.

Turning now to my invention it will be seen to consist primarily of a time interval contacting device which, in this instance, includes a back plate 21 and a front plate 22, which plates are held in spaced relation by the top 23, the bottom 24 and the pillar 25. In the plate 22 is mounted a sleeve 26 on whose inner end is mounted a short arm 27 having its end 28 turned parallel to the axis of the sleeve 26.

Within the sleeve 26 is mounted a second sleeve 29 on whose inner end is mounted the long arm 30 whose end 31 is turned inwardly parallel to the axis of the sleeve 29. On the outer end of the sleeve 26 is secured an arm 32 whose point 33 is turned backwardly upon itself. On the outer end of the sleeve 29 is formed an arm 34 whose point 35 is turned backwardly upon itself. Between the arms 32 and 34 and their respective points 33 and 35 is placed a dial 36 which is secured to the shaft 37 which journals in the sleeve 29 and at its opposite end in the plate 21.

On the enlarged portion 38 of the shaft 37 is mounted a large gear 39 which is frictionally driven from the shaft 37 through the spring arms 40. Meshing with the gear 39 is a pinion 41 on the shaft 42 on which is also secured a gear 43. The gear 43 meshes with the pinion 44 on the shaft 45 on which is secured a gear 46 which meshes with the pinion 47 on the shaft 48 on which is secured a gear 49 which meshes with the pinion 50 on the shaft 51 of the electric motor 52. Obviously, the spring motor or any time train could be employed for the purpose without departing from the spirit of this invention.

Journaling in the plates 21 and 22 is a shaft 53, a portion of which is square and provided at one end with a collar 54 which bears the slidable pinion 55 which has a square opening to receive the square portion of the shaft 53 and to be rotated thereby. The pinion 55 is provided with a groove 56 which receives the forked end 57 of the lever 58 which is pivoted on the pillar 25. The lower end 59 of the lever 58 is placed in the field of the electromagnet 60 which is mounted on the front plate 22. The pinion 55 is urged toward the collar 54 by means of the spring 61 which reacts against the collar 62 secured on the shaft 53. Movement is supplied to the shaft 53 by means of a gear 63 which is secured thereon and which meshes with a gear 64 on the shaft 42. It is desirable to chamfer and point the ends of the teeth on the side of the pinion 55 adjacent to the collar 54.

Between the plates 21 and 22 is mounted a pivot 65 on which is mounted a segment gear 66 which normally meshes with the pinion 55 and is driven thereby against the action of the spring 67 which is attached to the gear 66 and to the plate 22. On the gear 66 is formed an extension arm 68 having a turned end 69 and an ear 70 which carries the contact screw 71. On the pivot 65 is tiltably mounted the mercury tube 72 containing the electrodes 73 and 74. The tube 72 is held by means of a clamp 75 which forms a part of the double lever 76 whose end 77 is urged downwardly by means of a spring 78 and whose end 79 is provided with a laterally turned tip 80 which is directly in the path of the end 69 of the extension arm 68. A stop 81 is provided to limit the downward movement of the end 77 of the lever 76. A stop 82 is provided to limit the downward movement of the segment gear 66.

Directly in the path of the screw 71 is a contact arm 83 which is mounted on an insulated support 84. Mounted on the plate 21 is a bracket 85 upon which is pivotally mounted a tiltable roller 86 whose pivot 87 is midway between the paths of the tips 28 and 31. To the roller mounting is attached the arm 88 which is held on one side or the other of a central position by means of a spring 89, providing a quick movement for the arm 88 to either of its extreme positions, which brings its tip 90 into contact with either of the contact points 91 or 92, both of which are mounted on the bracket 93.

The dial 36 is provided with perforations 94 to correspond with the numbers 95 and indicates the hours of the day from 1 to 12 repeated, including one intermediate hole for a half hour. Into these holes can slip the pins 96 which are fastened on the arms 32 and 34.

On the shaft 97 is secured the flanged hub 98 which carries the fiber cam disks 99 and 100. On the outside of the disk 100 is mounted a metal contact disk 101 having a cut-away portion 102. Against the surface of the disk 101 ride the three brushes 103, 104 and 105, of which the brush 104 does not lie in the path of the recess 102 but is always on the metal, while the brushes 103 and 105 alternately drop off of the disk 101 and rest on the fiber cam disk 100. The cam disks 99 and 100 are held in relation to each other and to the hub 98 by means of the screw 106 which passes through all of these members. It is desirable to provide a bushing 107 which keeps the disk 101 from contacting with the hub 98.

Figure 10:
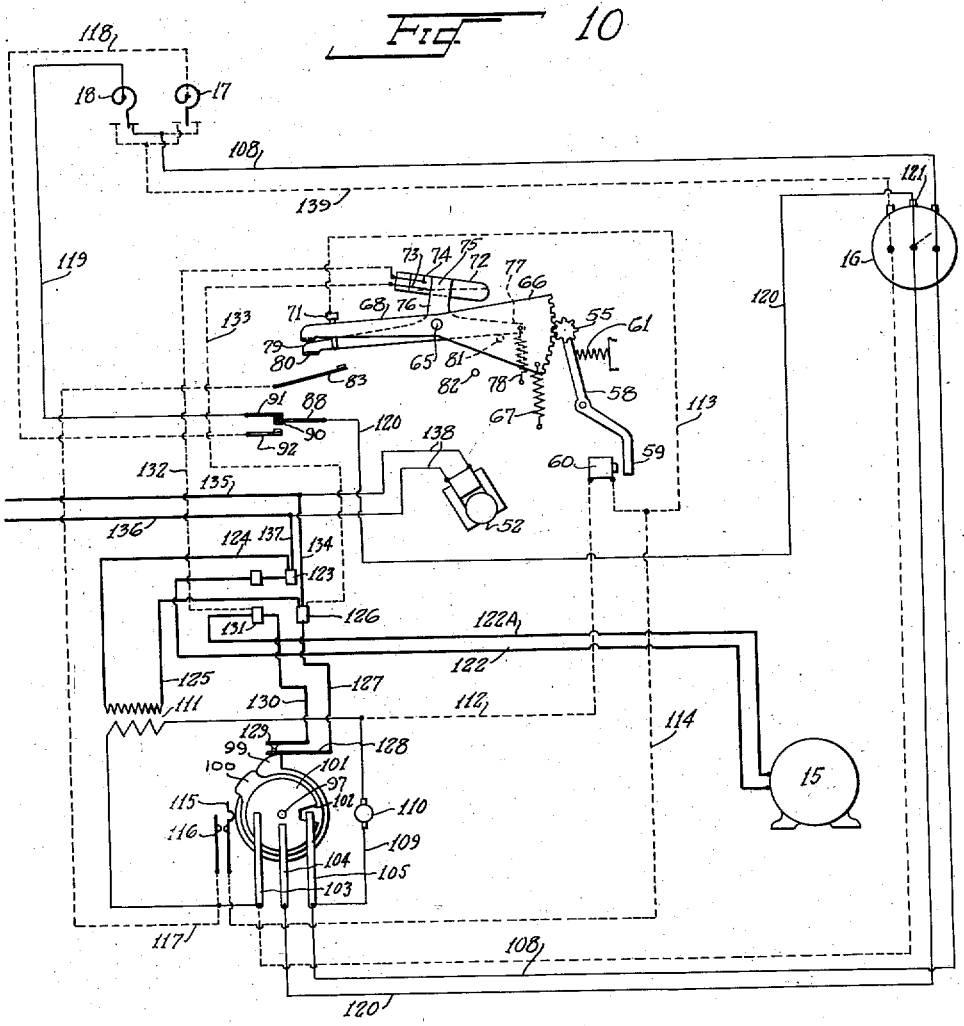
Figure 10 is a diagrammatic view showing the control segment in a midway position.
Figure 11:
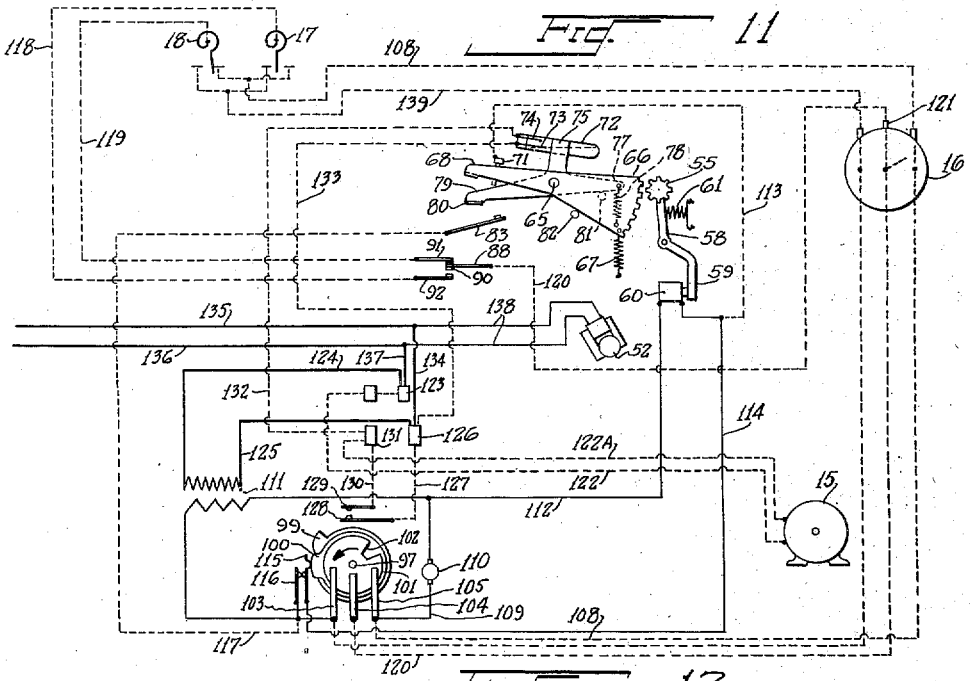
Figure 11 is similar to Fig. 10 showing the control segment released.
Figure 12:
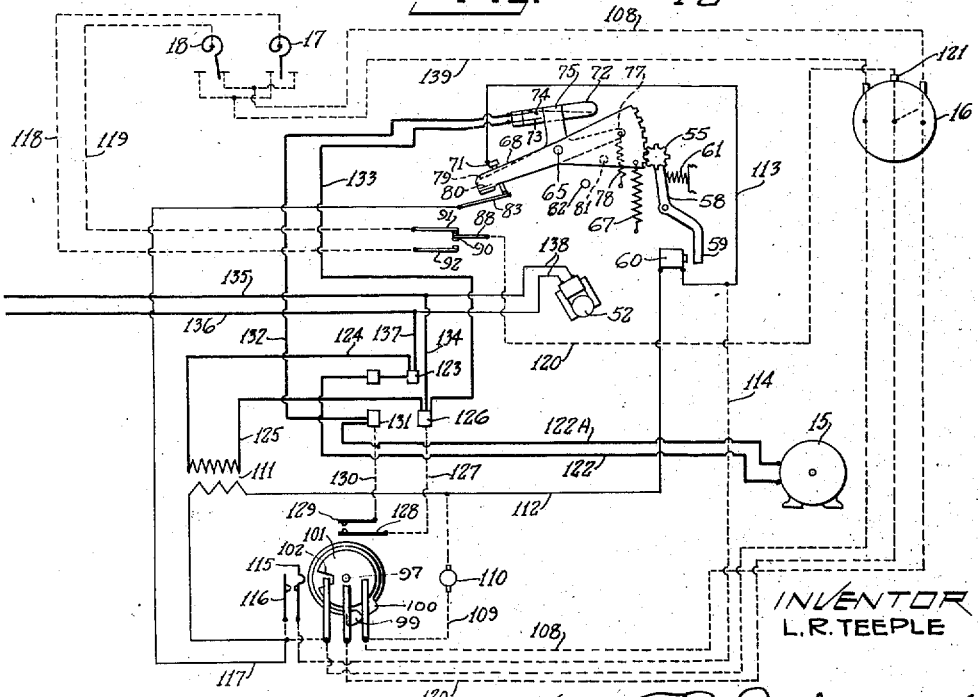
Figure 12 is similar to Fig. 11 but showing the segment at the completion of its travel.

In order to render more clear the wiring diagrams I have selected three representative positions of the device which are illustrated in Figures 10, 11 and 12 in the first of which the stoker motor 15 is running and the segment gear 66 is part way up. In Figure 11 the stoker motor 15 is not in operation and the segment gear has been allowed to drop to a starting position. In Figure 12 the stoker motor has been started after a full length period of inoperation. In the diagrammatic views shown in Figures 10 to 12 only those circuits through which current is flowing are shown in full lines, the remainder being shown in dotted lines.

As previously stated, a double thermostat is employed for day and night use and the stopping side of the thermostats 17 and 18 are joined by the wire 108 which passes through the pressure controlled switch 16 to the brush 105 from which a wire 109 passes through the motor 110 which drives the shaft 97. The wire 109 branches in one direction to the transformer 111 and thence back to the brush 103. From the wire 109 extends a wire 112 to the magnet 60 from which the wire 113 is connected to the screw 71. From the wire 113 extends the wire 114 which connects with the contact arm 115 which is operated by the cam disk 100. Associated with the contact arm 115 is a second contact arm 116 which is joined by the wire 117 to the wire 109 and then is joined to the contact arm 83.

The thermostatic element 17 is joined by means of the wire 118 to the contact point 92 and the contact point 91 is joined by means of the wire 119 to the thermostatic element 18. The arm 88 is joined by means of a wire 120 to the center pole 121 of the pressure controlled switch 16 from which it passes to the center brush 104 of the relay switch including the contact disk 101.

From the stoker motor 15 extends the wire 122 which terminates in a junction box 123 from which the lead 124 connects with one side of the transformer 111, the opposite side of which connects by means of the wire 125 to the junction box 126. From the junction box 126 extends a wire 127 which terminates in a contact arm 128 directly in line with the cam disk 99. Over the contact arm 128 is a second contact arm 129 which is joined by means of the wire 130 to the junction box 131. From the box 131 extends the wire 132 to the electrode 74 in the mercury tube 72. From the electrode 73 extends a wire 133 to the box 126. The box 126 is joined by means of the wire 134 to the line 135 whose opposite side 136 is joined by the wire 137 to the box 123. The motor 52 of the electric clock is joined to the line wires 135 and 136 by means of the wires 138. The start sides of the thermostatic elements 17 and 18 are joined by the wire 139 to the pressure controlled switch 16 to the brush 103.

In Figures 10 to 12 the manner of disengaging the pinion 55 and the gear 66 is shown in a slightly modified form, namely normal to that shown in the remaining figures, merely for the purpose of making the diagrams more easily understandable.

The operation of the device is as follows: Assuming that the parts are in the position shown in Fig. 10 in which the thermostatic element 18 has been heated sufficiently by the surrounding atmosphere to make the contact shown for the purpose of stopping the stoker motor 15, it will be seen that current now flows from the thermostat 18 (which will be taken as a starting point) through the wire 108 to the brush 105 which, at this particular moment, has its tip registering with the cut-away portion 102 of the disk 101. In other words, not making a contact with the disk 101. However, the brush 105 is connected by the wire 109 to the small motor 110 which drives the shaft 97. The motor 110 is connected by the wire 109 to the transformer 111 and the current then flows from the contact brush 103 through the disk 101 to the brush 104, then back through the wire 120 to the contact point 91 of the day and night switching apparatus previously described from whence the current flows through the wire 119 to the starting point, namely the thermostat 18.

It will be noted that during a previous operation the cam disk 99 has closed the contacts 128 and 129 which complete the circuit through the wires 122 and 122-A of the motor 15 thereby operating the stoker 15. During this time the motor 110 continues to operate bringing the parts to the position shown in Fig. 11 in which the cam disk 99 has permitted the contacts 128 and 129 to separate, thus stopping the motor 15 and in which the cam disk 100 has caused the contacts 115 and 116 to close, thereby causing current to flow from the transformer 111 through the wire 112 to the magnet 60 then back through the contacts 115 and 116 to the transformer 111. The energizing of the magnet 60 moves the pinion 55 out of mesh with the gear 66 allowing it to drop to the position shown in Fig. 11. This action causes the gear 66 to return to its initial point from which it will require a fixed period of time to operate same sufficiently to tip the mercury tube 72 for the purpose of closing the motor circuit.

Turning now to Fig. 12 it will be found to illustrate a condition which exists during that small period of time in which the magnet 60 is being energized but before it has performed any work. It will be noted that in this diagram current is not flowing to the motor 110 by reason of the fact that the disk 101 is dead. The motor 15 is now operated by reason of the fact that its circuit is closed through the mercurial tube 72, this closing operation having been performed by a given number of rotations of the pinion 55 as measured by a period of time elapsing since the last breaking of the circuit to the motor 15.

While there are a great many possible conditions which may exist only a few of the common and most repeatedly occurring conditions have been illustrated: for example, only the position of one thermostat during a time at which it is desired to stop the generation of heat is illustrated. Obviously, if a condition arose in which it was desired to call for heat the thermostatic element would swing to the opposite side and a corresponding operation would take place. Neither has it been found necessary to explain the repeated conditions for the two thermostats 17 and 18, which are merely what is known as day and night thermostats, one being operative during the period represented by the shaded portion of the dial 36 and the other covering the unshaded portion thereof.

It can be seen from the foregoing that I have not only provided a thermostatic control which will operate day and night in which it is possible to have one set of temperature limits for the day period and another set of temperature limits for the night period, but also a control in which the stoker will be periodically operated in co-relation with the thermostatic elements, and more important still that the length of this periodic operation will always be measured from the close of a cessation in the operation of the stoker motor. For example, if the stoker motor should operate continuously for one hour there would be no need of a periodic closing of the motor circuit during this time, but the moment the stoker ceases to operate there will be commenced a measurement of time, for example three hours, and if the stoker motor has not been operated during this period either manually or through the thermostatic elements then will ensue a short period operation of the stoker motor, let us say for two minutes, the purpose of which is to renew the fire and keep same from becoming extinguished. However, if, before the three hour period has elapsed, there is a call for heat and the stoker motor 15 is operated there will be a postponement in the measurement of the three hour period until the stoker motor again ceases to operate.

What I claim is:

1. The combination with a stoker, a motor for driving the stoker, and a source of power, of two independently operable means for connecting and disconnecting the stoker motor to and from the power source, thermal means for causing the first of said connecting means to operate in accordance with the temperature requirements of a space heated by the stoker, and time controlled means to cause the second connecting means to operate at chosen intervals for a period of time sufficient to keep the fire alive when no calls for heat are made by the thermal means, said time controlled means including a body revolving at a constant speed, a member movable in one direction to operate the second connecting means to cause the motor to drive the stoker, means constantly urging the member to move in reverse direction to an initial position, mechanism connecting the constantly revolving body and the member to drive said member in said one direction against the urge of said urging means, and means for temporarily freeing said member from said mechanism at the close of operation of the stoker motor by either of the two connecting means, whereby the member will be moved to said initial position upon completion of any fuel feeding operation.

2. The device of claim 1 in which the member oscillates and the second connecting means is a mercury switch which is thrown to "on" position at the end of the travel of the oscillating member.

3. The device of claim 1 in which the motor is an electric motor, the two connecting means are switches, and the body is a pinion.

4. The device of claim 1 in which the body is a pinion, the member is an oscillating gear, the mechanism includes a train of gears meshing with the pinion and the oscillating gear.

5. The device of claim 1 in which the last means includes an electric attracting device for withdrawing a gear of said mechanism from mesh with the proximate driven gear.

6. The combination with an electric motor for driving a stoker, and a thermostat control circuit for energizing said motor, of a time control circuit including switch mechanism yieldingly urged to "off" position to stop the motor if heat requirements in a chosen space adjacent said thermostat are satisfied, a control device for moving said switch mechanism to "on" position to energize the motor for a definite period after a chosen lapse of time provided there have been no calls for heat from said thermostat control circuit, and means operable with each stopping of the motor for momentarily releasing the switch mechanism from actuation by the control device, said last mentioned means including a circuit in which is placed a magnet which is energized whenever the motor stops, whereby the switch mechanism is moved to initial position upon being released, so that no period of time between any stopping of the motor and the next succeeding starting of the motor shall exceed the chosen period of time between feedings, no matter what the temperature may be in the chosen space in proximity to the thermostat.

7. In combination, a stoker, an electric motor for driving the stoker, a motor energizing circuit including a switch, cam means for closing said switch, a thermostat circuit for moving the cam means thru a portion of a revolution upon reaching a chosen maximum temperature and for moving the cam means thru the remainder of the 360° upon next reaching a chosen maximum, a second motor energizing circuit including a time switch normally held in "off" position, gear carried means, a constantly rotating train driving said gear means to move in a direction to overcome the normal holding of the time switch so that at the end of a chosen period of time the time switch will move sharply to "on" position, and means operated by the cam means once for each revolution of the cam means for moving the gear carried means to initial position.

8. The combination with a stoker motor, a power source, and thermal control means for connecting the motor to the power source, of a second means for connecting the motor to the power source and normally held in inoperative position, a time controlled device normally constantly moving from an initial position to move said second means to operative position after a chosen interval of time, and means for moving the device to initial position with each separation of the motor from said power source.

9. A control for stoker motors consisting of a motor operating circuit, a time train including means for driving same, a mercurial switch for the motor circuit associated with the time train, said time train having a segment gear for rocking the switch, a pinion normally meshing with said segment gear and driven from said time train, means for resetting said segment gear to its starting point at the completion of or during an intermediate position of its travel, and contact arms actuated by said segment gear.

10. A control mechanism for stoker motors consisting of a time train including means for operating same, a contact indicating dial driven by said time train, day and night circuits covering respective periods of said dial, means actuated by said time train for shifting the control of said circuits, a mercurial switch actuated by said time train whereby a stoker motor can be operated intermittently, and means for resetting said intermittent mechanism in a manner that a period of inoperation of the stoker motor shall commence at the closing of a period of operation thereof.

11. A control for a stoker motor consisting of a plurality of motor driven switching cams with a thermostatic control for the operation of said switching cams, an independent periodically operated motor controlled switch controlled by said cam switching mechanism whereby the stoker motor can be operated by said thermostat thru said cam switch in response to calls for heat or stopped thereby when sufficient heat is supplied, and a time controlled intermittently contacting device for closing and opening the motor circuit whose cycle of operation commences with a period of inoperation of the stoker motor measured in time from a close of an operating period of the stoker motor.

12. In a method for keeping a stoker fire alive when temperature requirements are met, and where solid fuel is fed to said fire by a motor in accordance with action of thermal and time controls; that step which consists in moving the time control to initial position immediately after the close of each period of operation of the motor so that each time control feeding of the fire, for a short definite period, to keep the fire alive shall always be made not later than a chosen lapse of time from the last feeding, whether such last feeding was as the result of thermal or of time requirement.

LAWRENCE R. TEEPLE.